(12) United States Patent
Fix et al.

(10) Patent No.: US 10,558,049 B2
(45) Date of Patent: *Feb. 11, 2020

(54) FOCAL SURFACE DISPLAY

(71) Applicant: Facebook Technologies, LLC, Menlo Park, CA (US)

(72) Inventors: Alexander Jobe Fix, Seattle, WA (US); Nathan Seigo Matsuda, Seattle, WA (US); Douglas Robert Lanman, Bellevue, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/412,324

(22) Filed: May 14, 2019

(65) Prior Publication Data

US 2019/0265484 A1    Aug. 29, 2019

Related U.S. Application Data

(63) Continuation of application No. 15/786,386, filed on Oct. 17, 2017, now Pat. No. 10,330,936.
(Continued)

(51) Int. Cl.
*G02B 26/06* (2006.01)
*G02B 27/01* (2006.01)
(Continued)

(52) U.S. Cl.
CPC .......... *G02B 27/0172* (2013.01); *F21V 19/02* (2013.01); *G02B 26/06* (2013.01);
(Continued)

(58) Field of Classification Search
CPC .... G02B 27/0172; G02B 26/06; G02B 27/28; G02B 2027/011; G02B 2027/0185;
(Continued)

(56) References Cited

U.S. PATENT DOCUMENTS 9,292,973 B2 * 3/2016 Bar-Zeev ............. G02B 27/017
10,330,936 B2 * 6/2019 Fix ......................... G02B 26/06
(Continued)

FOREIGN PATENT DOCUMENTS

WO   WO 2006/102201 A1   9/2006
WO   WO 2016/105281 A1   6/2016

OTHER PUBLICATIONS

European Extended Search Report, European Application No. 18151916.6, dated May 24, 2018, 9 pages.
(Continued)

*Primary Examiner* — Amit Chatly
(74) *Attorney, Agent, or Firm* — Fenwick & West LLP

(57) ABSTRACT

A head mounted display (HMD) adjusts the phase of light of a virtual scene using a spatially programmable focusing element. Depths of the virtual scene are approximated to one or more focal surfaces and the shape of the focal surfaces is then adjusted to minimize the distance of the focal surface to features in the virtual scene. The resulting shape of the focal surface is a continuous piecewise smooth three-dimensional curve. A phase function is generated for each focal surface that, when executed by the spatially programmable focusing element, reproduces a focal pattern corresponding to the each focal surface, which bends and shapes the wavefront to produce a focal pattern that conforms to the scene geometry.

20 Claims, 3 Drawing Sheets

Related U.S. Application Data

(60) Provisional application No. 62/508,002, filed on May 18, 2017, provisional application No. 62/448,303, filed on Jan. 19, 2017.

(51) Int. Cl.
*G02B 27/28* (2006.01)
*F21V 19/02* (2006.01)
*G02C 7/02* (2006.01)
*G02B 3/08* (2006.01)

(52) U.S. Cl.
CPC ............. *G02B 27/28* (2013.01); *G02C 7/022* (2013.01); *G02B 3/08* (2013.01); *G02B 2027/011* (2013.01); *G02B 2027/0145* (2013.01); *G02B 2027/0185* (2013.01)

(58) Field of Classification Search
CPC .. G02B 2027/0145; G02B 3/08; G02C 7/022; F21V 19/02
See application file for complete search history.

(56) References Cited

U.S. PATENT DOCUMENTS

| | | |
|---|---|---|
| 2005/0007603 A1 | 1/2005 | Arieli et al. |
| 2006/0232665 A1 | 10/2006 | Schowengerdt et al. |
| 2008/0049152 A1* | 2/2008 | Hong ..................... G02B 3/14 349/11 |
| 2008/0117289 A1* | 5/2008 | Schowengerdt ..... G02B 26/005 348/46 |
| 2016/0193104 A1* | 7/2016 | Du .......................... G02C 7/081 351/203 |

OTHER PUBLICATIONS

PCT International Search Report and Written Opinion, PCT Application No. PCT/US2018/012777, dated Apr. 30, 2018, 18 pages.

\* cited by examiner

FOCAL SURFACE DISPLAY

CROSS-REFERENCE TO RELATED APPLICATIONS

This application is a continuation of co-pending U.S. application Ser. No. 15/786,386, filed Oct. 17, 2017, which claims the benefit of U.S. Application No. 62/508,002, filed May 18, 2017 and U.S. Application No. 62/448,303, filed Jan. 19, 2017, which are incorporated by reference in their entirety.

BACKGROUND

The present disclosure generally relates to enhancing images from electronic displays, and specifically to varying the focal length of optics to enhance the images.

A head mounted display (HMD) can be used to simulate virtual environments. Conventional binocular HMDs vary the stimulus to vergence with the information being presented to a viewing user in a virtual scene, while the stimulus to accommodation remains fixed at the apparent distance of the display, as created by the viewing optics. Sustained vergence-accommodation conflict (VAC) has been associated with visual discomfort, motivating numerous proposals for delivering near-correct accommodation cues.

Vergence is the simultaneous movement or rotation of both eyes in opposite directions to obtain or maintain single binocular vision which is connected to accommodation of the eye. Under normal conditions, changing the focus of the eyes to look at an object at a different distance automatically causes vergence and accommodation. For example, as a real object moves closer to a user looking at the real object, the user's eyes rotate inward to stay verged on the object. As the object gets closer to the user, the eyes must "accommodate" for the closer distance by reducing the power or focal length, which is achieved automatically by each eye changing its shape. Thus, under normal conditions in the real world, the vergence depth corresponds to where the user is looking, which also equals the focal length of the user's eyes.

A conflict between vergence and accommodation, however, often occurs with some three-dimensional (3D) electronic displays. For example, as a virtual object is rendered on the 3D electronic display to move closer to a user looking at the object, each of the user's eyes rotates inward to stay verged on the object, but the power or focal length of each eye is not reduced; hence, the user's eyes do not accommodate as in the real-world. Instead of reducing power or focal length to accommodate for the closer vergence depth, the eyes maintain accommodation at a distance associated with 3D electronic display. Thus, the vergence depth often does not equal the focal length for the human eye for objects displayed on 3D electronic displays. This discrepancy between vergence depth and focal length is referred to as "vergence-accommodation conflict." A user experiencing only vergence or accommodation (and not both simultaneously) can experience some degree of fatigue or nausea, which is undesirable for virtual reality system creators.

SUMMARY

A head mounted display (HMD) adjusts the phase of light of a virtual scene received from an electronic display using a spatially programmable focusing element, such as a spatial light modulator operating in a phase-modulation mode. For example, the headset receives virtual scene data for the virtual scene that includes scene geometry data or depth values for different components of or points in the virtual scene. Before light of the virtual scene is received by an eye of a user viewing the virtual scene, a spatial light modulator (SLM) adjusts a focal pattern or wavefront of the light for the virtual scene. While conventional head mounted displays typically deliver a single fixed focal surface, the SLM operates as a programmable lens with a spatially varying focal length, allowing the virtual image of different pixels of the HMD's display to appear (from an exit pupil of the HMD) to be formed at different depths within the virtual scene, thereby, shaping synthesized focal surfaces to conform to the virtual scene geometry.

To determine the positions of the focal surfaces in the virtual scene, the range of depth values of the virtual scene are approximated to a set of one or more discrete depth values based on the scene geometry data. In one embodiment, scene points in the virtual scene are clustered based on their associated depth values to identify the set of one or more discrete depth values corresponding to the mean depth value of each cluster. The depth of the virtual scene is then segmented into one or more focal planes at the each of the one or more discrete depth values within the virtual scene. Accordingly, for each focal plane, the shape of the focal plane is adjusted to minimize the distance of the focal plane to each scene point in the cluster. This warps the shape of the focal plane to where it makes sense to start referring to the focal plane as a focal surface since the focal plane is bent, warped, and/or modified to conform to a set of scene points, components, or features nearest to the focal plane in the virtual scene. The resulting shape of the focal surface is a continuous piecewise smooth three-dimensional curve, unlike multifocal displays with planar surfaces located at fixed focal depths. Thus, for example, a scene could be segmented into three focal surfaces (near, intermediate, far) that are each differently bent or warped to respectively conform to (near, intermediate, far) objects in the virtual scene.

Given a set of focal surfaces, a phase function is generated for each focal surface. The phase function, when executed by the SLM, causes the SLM to reproduce a focal pattern corresponding to the each focal surface. This is achieved by the SLM adding phase delays to a wavefront of the light from the electronic display. The phase delays cause the shape of the wavefront to be bent and warped into the shape of each focal surface to thereby produce a focal pattern that conforms to the scene geometry.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Figure 1:
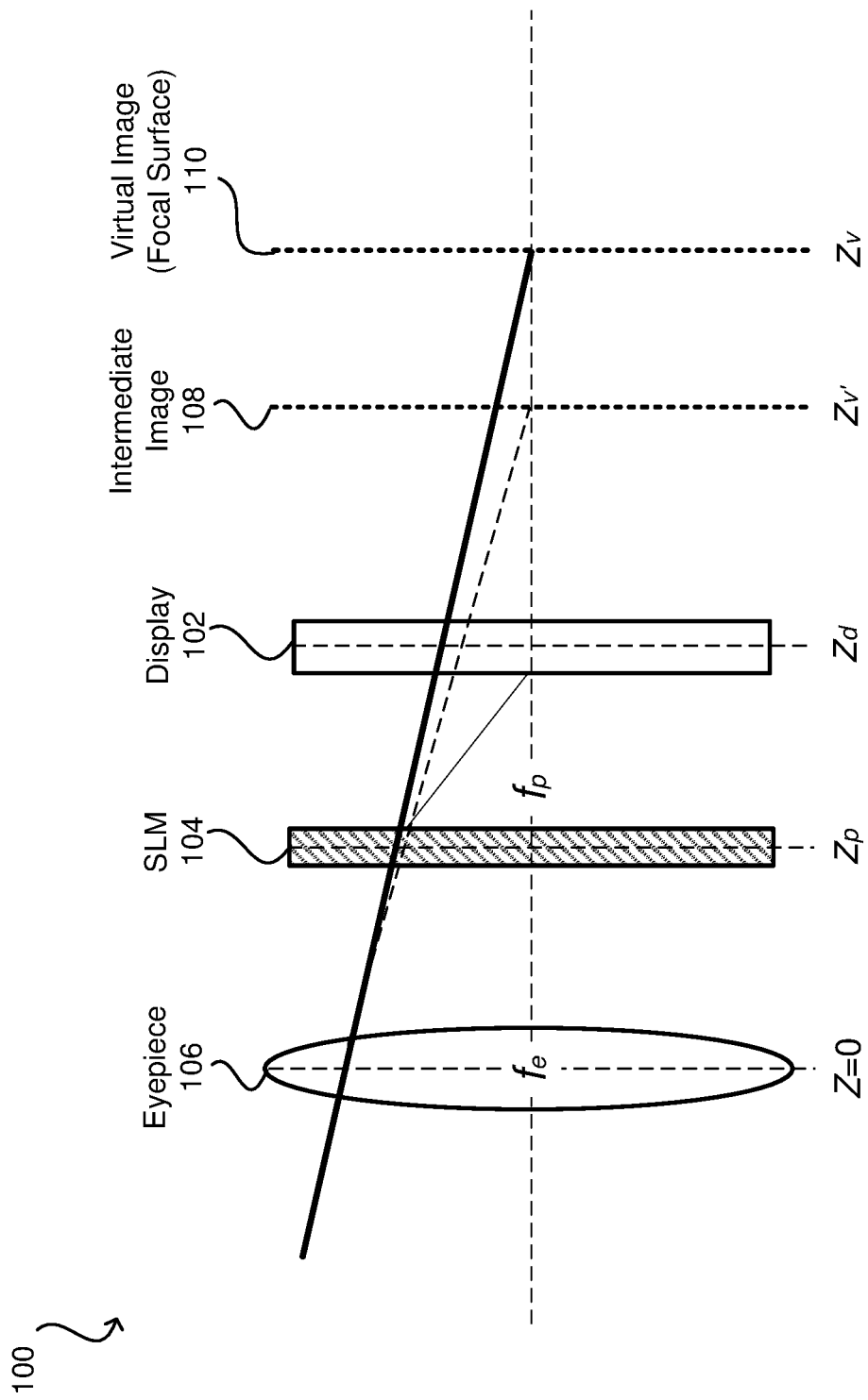
FIG. 1 shows example ray diagram for an optical system that can be incorporated into a head mounted display, in accordance with at least one embodiment.

A conventional head mounted displays contain an eyepiece and an electronic display that deliver a single, fixed focal surface. FIG. 1 shows a focal surface display 100 that includes electronic display element ("display") 102 and a phase-modifying spatial light modulator (SLM) 104 between eyepiece 106 and display 102. The SLM 104 operates as a programmable lens with a spatially varying focal length, allowing the virtual image 110 of different display pixels of the display 102 to appear to be formed at different depths within a virtual scene. Thus, the SLM 104 acts as a dynamic freeform lens, shaping synthesized focal surfaces that conform to the virtual scene geometry. Accordingly, a system and method for decomposing a virtual scene into one or more of these focal surfaces is disclosed.

A depth map, representing the scene geometry, and a focal stack, modeling the variation of retinal blur with changes in accommodation are provided to the system as inputs. In one embodiment, both inputs are rendered from the perspective of a viewing user's entrance pupil and the outputs of the system are k phase functions $\phi_1, \ldots, \phi_k$ and color images $c_1, \ldots, c_k$, to be presented by the SLM 104 and display 102. Ideally, the phase functions and color images are jointly optimize; however, this results in a large, nonlinear problem. Accordingly, approximations are introduced to ensure that the method is computationally tractable. First, instead of accounting for every possible depth in the virtual scene, a depth map of the virtual scene is decomposed or segmented into a set of smooth focal surfaces to which at least most (and if not all) depths of the virtual scene can be approximated. Then, the phase functions for the SLM are optimized to approximate these focal surfaces. Finally, the color images are optimized to reproduce the target focal stack. Thus, while the disclosed system provides for multiple focal surfaces, a single focal surface may theoretically achieve similar retinal blur fidelity; however, multiple focal surfaces can offer an advantageous trade-off between system complexity (e.g., the need for time multiplexing) and image quality (e.g., suppression of compression artifacts) relative to a single focal surface as provided by other prior multifocal display systems.

System Overview

Figure 2:
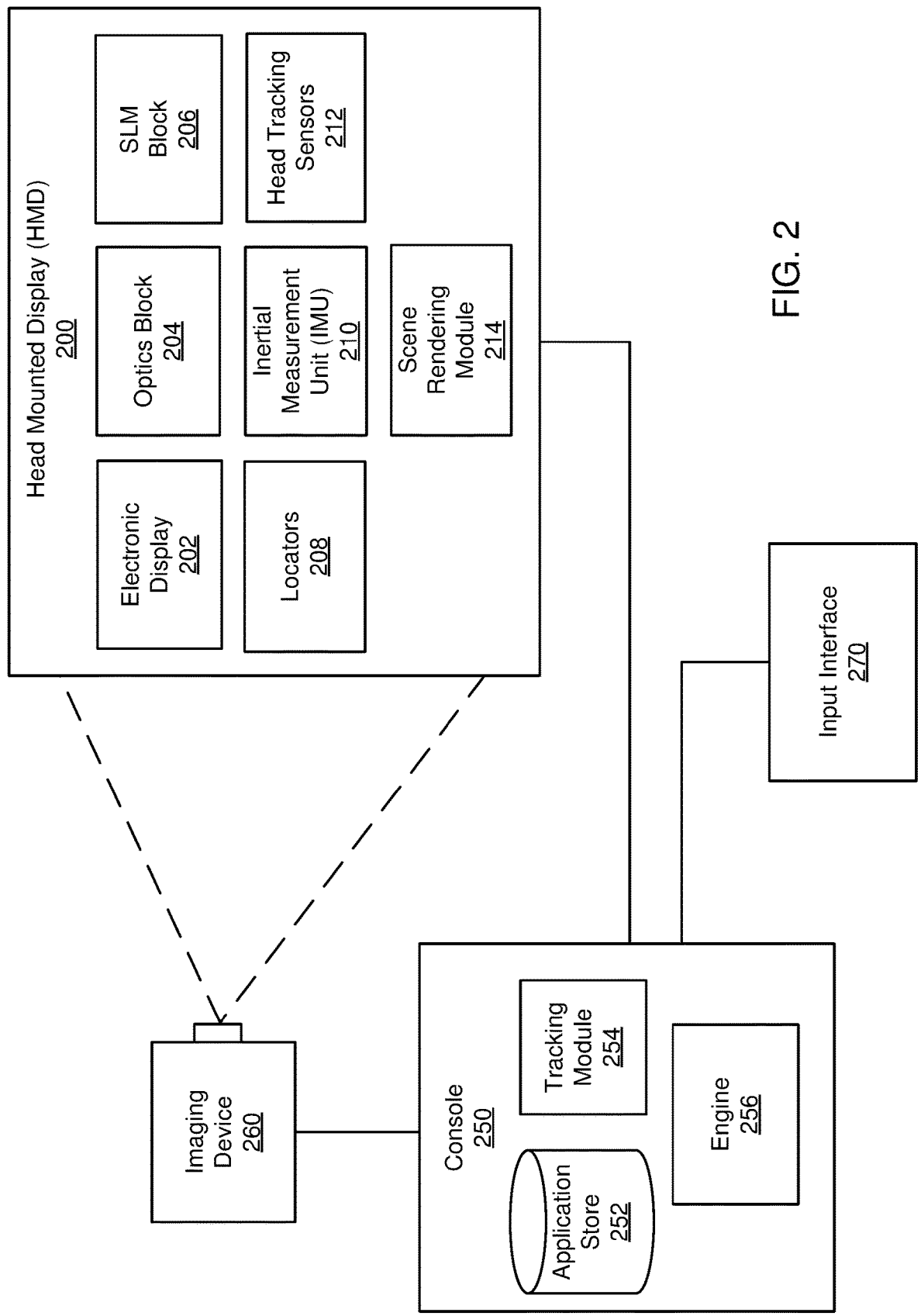
FIG. 2 shows an example system, in accordance with at least one embodiment.

FIG. 2 is system environment in which a console 250 operates. In this example, the system environment includes HMD 200, imaging device 260, and input interface 270, which are each coupled to console 250. While FIG. 2 shows a single HMD 200, a single imaging device 260, and a single input interface 270, in other embodiments, any number of these components may be included in the system. For example, there may be multiple headsets 202 each having an associated input interface 270 and being monitored by one or more imaging devices 260, with each headset 202, input interface 270, and imaging devices 260 communicating with the console 250. In alternative configurations, different and/or additional components may also be included in the system environment 200.

HMD 200 is a Head-Mounted Display (HMD) that presents content to a user. Example content includes images, video, audio, or some combination thereof. Audio content may be presented via a separate device (e.g., speakers and/or headphones) external to HMD 200 that receives audio information from HMD 200, console 250, or both. HMD 200 includes electronic display 202, optics block 204, spatial light modulator (SLM) block 206, one or more locators 208, internal measurement unit (IMU) 210, head tracking sensors 212, and scene rendering module 214.

Optics block 204 directs light from display 202 via SLM block 206 to an exit pupil of HMD 200 for viewing by a user using one or more optical elements, such as apertures, Fresnel lenses, convex lenses, concave lenses, filters, and so forth, and may include combinations of different optical elements. In some embodiments, one or more optical elements in optics block 204 may have one or more coatings, such as anti-reflective coatings. Magnification of the image light by optics block 204 allows electronic display 202 to be physically smaller, weigh less, and consume less power than larger displays. Additionally, magnification of the image light may increase a field of view of the displayed content. For example, the field of view of the displayed content is such that the displayed content is presented using almost all (e.g., 150 degrees diagonal), and in some cases all, of the user's field of view.

Spatial Light Modulator (SLM) block 206 includes one or more drivers to control electronic display 202 and an SLM to generate and display images of the virtual scene with dynamic spatiotemporal focal surfaces. SLM block 206, provided in optical series with optics block 204, operates in phase-only mode and, for a given frame, may generate multiple phase functions each corresponding to a focal pattern of a different range of depths within the virtual scene. In various embodiments, SLM block 206 could be integrated into optics block 204. In one embodiment, the each focal surface adjusts the focal pattern to vary the focal length (or optical power) of HMD 200 to keep a user's eyes in a zone of comfort while viewing content of the virtual scene.

The position of SLM block 206 within the optical system of HMD 200 is subject to design rules which limit certain performance parameters based on the respective configuration because of the limited resolution of the SLM. Thus, there are tradeoffs between configurations and their associated performance. For example, the focal range of HMD 200 can be limited based on the location of SML block 206 relative to electronic display 202 and optics block 204. In this example, a larger focal range is achieved as the SLM is positioned closer to optics block 204 rather than display 202. Thus, as the SLM is positioned closer to display 202, the focal range is limited. Additionally, a larger field of view is also achievable as the SLM is positioned closer to optics block 204 rather than display 202 and, thus, as the SLM is positioned closer to display 202, the field of view is limited. However, as the SLM is positioned closer to optics block 204, edge boundary sharpness in the virtual scene is degraded. Thus, the closer the SLM is positioned to display 202, the sharper the edge boundaries. Accordingly, there are design tradeoffs and a balance to be sought between edge sharpness versus focal range and field of view.

Locators 208 are objects located in specific positions on HMD 200 relative to one another and relative to a specific reference point on HMD 200. Locator 208 may be a light emitting diode (LED), a corner cube reflector, a reflective marker, a type of light source that contrasts with an environment in which HMD 200 operates, or some combination thereof. Active locators 208 (i.e., an LED or other type of light emitting device) may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

Locators 208 can be located beneath an outer surface of HMD 200, which is transparent to the wavelengths of light emitted or reflected by locators 208 or is thin enough not to substantially attenuate the wavelengths of light emitted or reflected by locators 208. Further, the outer surface or other portions of HMD 200 can be opaque in the visible band of wavelengths of light. Thus, locators 208 may emit light in the IR band while under an outer surface of HMD 200 that is transparent in the IR band but opaque in the visible band.

IMU 210 is an electronic device that generates fast calibration data based on measurement signals received from one or more head tracking sensors 210, which generate one or more measurement signals in response to motion of HMD 200. Examples of head tracking sensors 212 include accelerometers, gyroscopes, magnetometers, other sensors suitable for detecting motion, correcting error associated with IMU 210, or some combination thereof. Head tracking sensors 212 may be located external to IMU 210, internal to IMU 210, or some combination thereof.

Based on the measurement signals from head tracking sensors 212, IMU 210 generates fast calibration data indicating an estimated position of HMD 200 relative to an initial position of HMD 200. For example, head tracking sensors 212 include multiple accelerometers to measure translational motion (forward/back, up/down, left/right) and multiple gyroscopes to measure rotational motion (e.g., pitch, yaw, and roll). IMU 210 can, for example, rapidly sample the measurement signals and calculate the estimated position of HMD 200 from the sampled data. For example, IMU 210 integrates measurement signals received from the accelerometers over time to estimate a velocity vector and integrates the velocity vector over time to determine an estimated position of a reference point on HMD 200. The reference point is a point that may be used to describe the position of HMD 200. While the reference point may generally be defined as a point in space, in various embodiments, reference point is defined as a point within HMD 200 (e.g., a center of the IMU 210). Alternatively, IMU 210 provides the sampled measurement signals to console 250, which determines the fast calibration data.

IMU 210 can additionally receive one or more calibration parameters from console 250. As further discussed below, the one or more calibration parameters are used to maintain tracking of HMD 200. Based on a received calibration parameter, IMU 210 may adjust one or more IMU parameters (e.g., sample rate). In some embodiments, certain calibration parameters cause IMU 210 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

Scene rendering module 214 receives content for the virtual scene from engine 256 and provides the content for display on electronic display 202. Additionally, scene rendering module 214 determines a portion of the content to be displayed on electronic display 202 based on one or more of tracking module 254, head tracking sensors 212, or IMU 210, as described further below.

Imaging device 260 generates slow calibration data in accordance with calibration parameters received from console 250. Slow calibration data includes one or more images showing observed positions of locators 208 that are detectable by imaging device 260. Imaging device 260 may include one or more cameras, one or more video cameras, other devices capable of capturing images including one or more locators 208, or some combination thereof. Additionally, imaging device 260 may include one or more filters (e.g., for increasing signal to noise ratio). Imaging device 260 is configured to detect light emitted or reflected from locators 208 in a field of view of imaging device 260. In embodiments where locators 208 include passive elements (e.g., a retroreflector), imaging device 260 may include a light source that illuminates some or all of locators 208, which retro-reflect the light towards the light source in imaging device 260. Slow calibration data is communicated from imaging device 260 to console 250, and imaging device 260 receives one or more calibration parameters from console 250 to adjust one or more imaging parameters (e.g., focal length, focus, frame rate, ISO, sensor temperature, shutter speed, aperture, etc.).

Input interface 270 is a device that allows a user to send action requests to console 250. An action request is a request to perform a particular action. For example, an action request may be to start or end an application or to perform a particular action within the application. Input interface 270 may include one or more input devices. Example input devices include a keyboard, a mouse, a game controller, or any other suitable device for receiving action requests and communicating the received action requests to console 250. An action request received by input interface 270 is communicated to console 250, which performs an action corresponding to the action request. In some embodiments, input interface 270 may provide haptic feedback to the user in accordance with instructions received from console 250. For example, haptic feedback is provided by the input interface 470 when an action request is received, or console 250 communicates instructions to input interface 270 causing input interface 270 to generate haptic feedback when console 250 performs an action.

Console 250 provides content to HMD 200 for presentation to the user in accordance with information received from imaging device 260, HMD 200, or input interface 270. In the example shown in FIG. 2, console 250 includes application store 252, tracking module 254, and virtual reality (VR) engine 256. Some embodiments of console 250 have different or additional modules than those described in conjunction with FIG. 2. Similarly, the functions further described below may be distributed among components of console 250 in a different manner than is described here.

Application store 252 stores one or more applications for execution by console 250. An application is a group of instructions, that when executed by a processor, generates content for presentation to the user. Content generated by an application may be in response to inputs received from the user via movement of HMD 200 or input interface 270. Examples of applications include gaming applications, conferencing applications, video playback application, or other suitable applications.

Tracking module 254 calibrates the system using one or more calibration parameters and may adjust one or more calibration parameters to reduce error in determining position of HMD 200. For example, tracking module 254 adjusts the focus of imaging device 260 to obtain a more accurate position for observed locators 212 on HMD 200. Moreover, calibration performed by tracking module 254 also accounts for information received from IMU 210. Additionally, if tracking of HMD 200 is lost (e.g., imaging device 260 loses line of sight of at least a threshold number of locators 208), tracking module 254 re-calibrates some or all of the system components.

Additionally, tracking module 254 tracks the movement of HMD 200 using slow calibration information from imaging device 260 and determines positions of a reference point on HMD 200 using observed locators from the slow calibration information and a model of HMD 200. Tracking module 254 also determines positions of the reference point on HMD 200 using position information from the fast calibration information from IMU 210 on HMD 200. Additionally, tracking module 254 may use portions of the fast calibration information, the slow calibration information, or some combination thereof, to predict a future location of HMD 200, which is provided to engine 256.

Engine 256 executes applications within the system and receives position information, acceleration information, velocity information, predicted future positions, or some combination thereof for HMD 200 from tracking module 254. Based on the received information, engine 256 determines content to provide to HMD 200 for presentation to the user, such as a virtual scene. For example, if the received information indicates that the user has looked to the left, engine 256 generates content for HMD 200 that mirrors or tracks the user's movement in a virtual environment. Additionally, engine 256 performs an action within an application executing on console 250 in response to an action request received from the input interface 270 and provides feedback to the user that the action was performed. The provided feedback may be visual or audible feedback via HMD 200 or haptic feedback via input interface 270.

Figure 3:
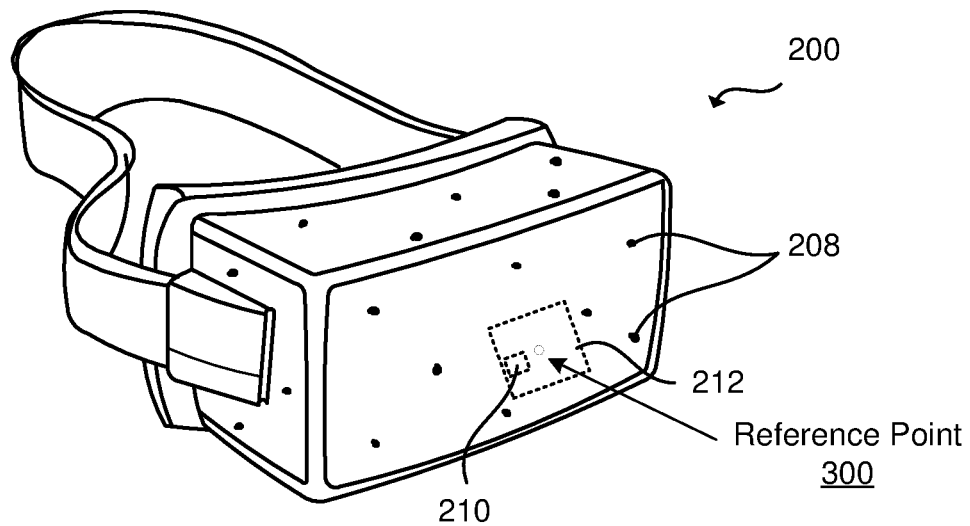
FIG. 3 shows a diagram of a head mounted display, in accordance with at least one embodiment.

FIG. 3 is a diagram of HMD 200, in accordance with at least one embodiment. In this example, HMD 200 includes a front rigid body and a band that goes around a user's head. The front rigid body includes one or more electronic display elements corresponding to electronic display 202, IMU 210, head tracking sensors 212, and locators 208. In this example, head tracking sensors 212 are located within IMU 210.

Locators 208 are located in fixed positions on the front rigid body relative to one another and relative to reference point 300. In this example, reference point 300 is located at the center of IMU 210. Each of locators 208 emits light that is detectable by imaging device 260. Locators 208, or portions of locators 208, are located on a front side, a top side, a bottom side, a right side, and a left side of the front rigid body, as shown FIG. 3.

Focal Surface Display Method

Figure 4:
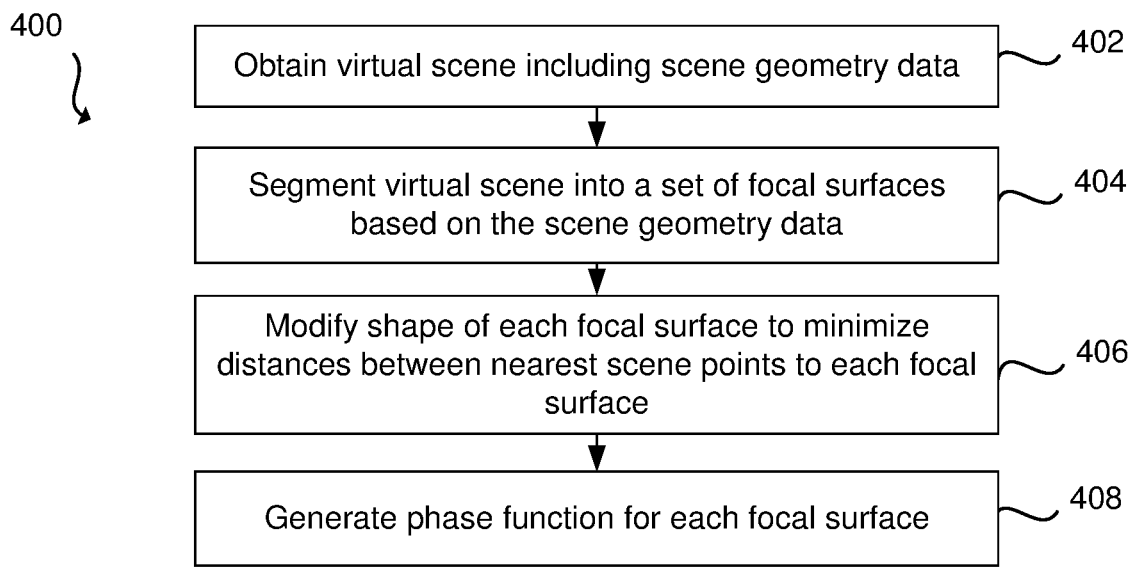
FIG. 4 shows an example process for mitigating vergence-accommodation conflict, in accordance with at least one embodiment.

FIG. 4 shows an example process 400 for mitigating vergence-accommodation conflict, in accordance with at least one embodiment. As discussed above, a head mounted display can provide focus accommodation and depth of field blur using a SLM. Accordingly, in this example, virtual scene data for displaying a virtual scene is obtained 402. In one example, each pixel of electronic display is associated with an individual depth value, such as infinity for sky displayed in the virtual scene, one meter for an object on a table and varying distance between half a meter and one meter for the surface of the table, 3 meters for a far wall in the virtual scene, and so forth.

Using the scene geometry data, the virtual scene is segmented 402 into a set of focal surfaces. To determine the positions of the focal surfaces in the virtual scene, the range of depth values of the virtual scene are approximated to a set of one or more discrete depth values based on the scene geometry data. For example, given a target virtual scene, let $\hat{d}(\theta_x, \theta_y)$ be the depth (in diopters) along each viewing angle $(\theta_x, \theta_y) \in \Omega_\theta$, for chief rays passing through the center of a viewing user's pupil with $\Omega_\theta$ being the discrete set of retinal image samples. If it were possible for phase SLMs to produce focal surfaces of arbitrary topology, then no further optimization would be required; however, this is not the case since focal surfaces are required to be smooth. Accordingly, a depth map of the virtual scene is segmented 402 into k smooth focal surfaces $d_1, \ldots, d_k$. For example, if for every viewing angle $(\theta_x, \theta_y)$ there is at least one focal surface $d_i(\theta_x, \theta_y)$ close to a target depth map $\hat{d}(\theta_x, \theta_y)$, then every scene element can be depicted with near correct retinal blur, as light from display 102 will appear to originate from the correct scene depth. Optimized blending methods still benefit the rendition of occluding, semi-transparent, and reflective objects). Given this goal, the following optimization problem has been formulated.

$$\min_{d_1,\ldots,d_k} \sum_{(\theta_x, \theta_y) \in \Omega_\theta} \left( \min_i |\hat{d}(\theta_x, \theta_y) - d_i(\theta_x, \theta_y)| \right)^2 \quad (1)$$

$$\text{s.t.} \left( \frac{\partial^2 d_i}{\partial x^2} \right)^2 + \left( \frac{\partial^2 d_i}{\partial x \partial y} \right)^2 + \left( \frac{\partial^2 d_i}{\partial y^2} \right)^2 < \epsilon$$

As further discussed below, generating a focal surface using a phase function $\phi$ may introduce optical aberrations. Observationally, aberrations are minimized if the second derivatives of the focal surface are small. This observation is reflected by the bound constraints in the above optimization problem. Note, however, that no explicit bound constraints are imposed on the optical powers d of the focal surfaces. This would appear to contradict this derivation of the minimum realizable focal length of SLM 104. Rather than adding these constraints directly, the target depth map $\hat{d}$ has been truncated to a realizable range of depths.

Accordingly, for each focal plane, the shape of the focal plane is modified 406 to minimize the distance of the focal plane to each scene point in the cluster. This warps the shape of the focal plane to where it makes sense to start referring to the focal plane as a focal surface since the focal plane is bent, warped, and/or modified to conform to a set of scene points, components, or features nearest to the focal plane in the virtual scene. The resulting shape of the focal surface is a continuous piecewise smooth three-dimensional curve, unlike multifocal displays with planar surfaces located at fixed focal depths. A nonlinear least squares is applied to solve Equation 1, which scales to large problem sizes. Note that the objective involves the nonlinear residual $g_{\theta_x, \theta_y}(d) = \min_i |\hat{d}(\theta_x, \theta_y) - d_i(\theta_x, \theta_y)|$ for each pixel $(\theta_x, \theta_y)$. This residual is not differentiable, which is a problem for nonlinear least squares. However, a close approximation is obtained by replacing the min with a "soft minimum" (soft-min), with the following definition:

$$\tilde{g}_{\theta_x, \theta_y}(d) = -t \log \sum_i e^{-|\hat{d}(\theta_x, \theta_y) - d_i(\theta_x, \theta_y)|/t}, \quad (2)$$

where t is a conditioning parameter that is tuned for a given application.

Applying Equation 2 to Equation 1, and re-expressing bound constraints as soft constraints, yields the following nonlinear least squares problem:

$$\min_{d_1,\ldots,d_k} \sum_{(\theta_x, \theta_y)} \left( \tilde{g}_{\theta_x, \theta_y}(d) \right)^2 + \gamma \sum_{i,(\theta_x, \theta_y)} \|\partial^2 d_i(\theta_x, \theta_y)\|^2, \quad (3)$$

where $\partial^2 d_i(\theta_x, \theta_y)$ is the vector of second partial derivatives of $d_i$ at $(\theta_x, \theta_y)$ and y is a weighting parameter.

Given a set of focal surfaces, a phase function is generated 408 for each focal surface. Provided the set of focal surfaces $d_i$, the next step includes solving for a set of phase functions $\phi_i$ to generate each focal surface. To solve this problem, the optical properties of a phase SLM must be understood. Variations in optical path length through a lens cause refraction. Similarly, differences in phase modulation across an SLM result in diffraction. Simulation of light propagation through a high-resolution SLM, via wave optics modeling, is currently computationally infeasible, but one can approximate these diffractive effects using geometric optics.

Accordingly, let $(p_x, p_y)$ denote SLM locations, with $\Omega_p$ being the discrete set of SLM pixel centers. Optical rays intersecting an SLM are redirected depending on the phase $\phi$. For small angles (i.e., under the paraxial approximation), the deflection is proportional to the gradient of $\phi$. If an incident ray has direction vector $(x, y, 1)$ and intersects the SLM at $(p_x, p_y)$, then the outgoing ray has direction vector:

$$\left(x + \frac{\lambda}{2\pi}\frac{\partial \phi}{\partial x}(p_x, p_y), y + \frac{\lambda}{2\pi}\frac{\partial \phi}{\partial y}(p_x, p_y), 1\right), \quad (4)$$

where $\lambda$ is the illumination wavelength. Thus, if $\phi$ is a linear function, then the SLM operates as a prism, adding a constant offset to the direction of every ray. (Note that monochromatic illumination in this derivation is assumed, with practical considerations for broadband illumination sources presented later). An SLM may also act as a thin lens by presenting a quadratically varying phase as follows.

$$\phi(p_x, p_y) = -\frac{\pi}{\lambda f}(p_x^2 + p_y^2) \quad (5)$$

Note that these optical properties are local. The deflection of a single ray only depends on the first-order Taylor series of the phase (i.e., the phase gradient) around the point of intersection with the SLM. Similarly, the change in focus of an c-sized bundle of rays intersecting the SLM only depends on the second-order Taylor series. Specifically, if the Hessian of $\phi$ at a point $(p_x, p_y)$ is given by $$H_\phi(p_x, p_y) = -\frac{2\pi}{\lambda f} I, \quad (6)$$

where I is the 2×2 identity matrix, then the c-sized neighborhood around $(p_x, p_y)$ functions as a lens of focal length f (i.e., Equation 6 is the Hessian of Equation 5).

To this point, we have allowed the phase to be any real-valued function. In practice, an SLM will have a bounded range, typically from $[0, 2\pi]$. Phases outside this range are "wrapped", modulo $2\pi$. In addition, achievable phase functions are restricted by the Nyquist limit. The phase can change by no more $2\pi$ over a distance of $2\delta p$, where $\delta p$ is the SLM pixel pitch.

Accordingly, with this paraxial model of the SLM, a phase function $\phi$ to best realize a given target focal surface d is determined. First, referring to FIG. 1, how the focal length $f_p$ (from Equation 5) of SLM 104 affects a focal surface distance $z_v$ is determined. As shown in FIG. 1, SLM 104 operates within a focal surface display 100 that is parameterized by the eyepiece 106 distance (z=0), the SLM 104 distance $z_p$, and the display 102 distance $z_d$. Ignoring the eyepiece 106, the SLM 104 produces an intermediate image 108 of the display 102 at distance $z_{v'}$. Intermediate image 108 is transformed into a virtual image 110 of the display 102, located at $z_v$, depending on the eyepiece 106 focal length $f_e$. These relations are compactly summarized by application of the thin lens equation:

$$\frac{1}{f_p} = \frac{1}{z_{v'} - z_p} + \frac{1}{z_d - z_p} \text{ and } \frac{1}{f_e} = \frac{1}{z_v} - \frac{1}{z_{v'}}. \quad (7)$$

By casting viewing ray $(\theta_x, \theta_y)$ from the viewer's pupil to SLM 104, and then by applying Equation 7, a target focal length $f_p$ can be assigned for each SLM pixel $(p_x, p_y)$ to create a virtual image 110 at the desired focal surface depth. To realize this focal length, Equation 6 requires a phase function $\phi$ with the Hessian $$H_\phi(p_x, p_y) = -\frac{2\pi}{\lambda f(p_x, p_y)} I. \quad (8)$$

There may not be $\phi$ that satisfies this expression. In fact, such a $\phi$ only exists when f is constant and $\phi$ is quadratic (i.e., the phase represents a uniform lens). Since Equation 8 cannot be exactly satisfied, the following linear least squares problem is solved for to obtain a phase function $\phi$ that is as close as possible:

$$\min_\phi \sum_{(p_x, p_y) \in \Omega_p} \left\| \hat{H}[\phi](p_x, p_y) - \frac{-2\pi}{\lambda f(p_x, p_y)} I \right\|_F^2, \quad (9)$$

where $\|\cdot\|_F^2$ is the Frobenius norm and where $H[\cdot]$ is the discrete Hessian operator, given by finite differences of $\phi$. Note that the phase function $\phi$ plus any linear function a+bx+cy has the same Hessian H, so we additionally constrain $\phi(0, 0)=0$ and $\nabla\phi(0, 0)=0$.

Having determined k phase functions $\phi_i$, corresponding to focal surfaces $d_i$, color images $c_i$ are determined for presentation on display 102, to reproduce the target focal stack. This focal stack is represented by a set of l retinal images $r_1, \ldots, r_l$. First, a ray-traced model of retinal blur is described and then this model is applied to evaluate the forward and adjoint operators required to solve the linear least squares problem representing optimized blending.

An optical ray is traced through the system under a geometric optics model where each ray originates at a point within the viewer's pupil. The ray then passes through the front and back of the eyepiece 106, the SLM 104, and then impinges on the display 102. At the eyepiece 106 surfaces, rays are refracted using the radius of curvature of the lens, its optical index, and the paraxial approximation. Equation 4 models light transport through the SLM 104. Each ray is assigned the color interpolated at its coordinate of intersection with the display 102. The locations on the display are denoted by $(q_x, q_y)$ and the set of display pixel centers by $\Omega_q$. Note that any rays that miss the bounds of the eyepiece 106, SLM 104, or display 102 are culled (i.e., are assigned a black color).

To model retinal blur, rays that span the viewer's pupil are accumulated, which are sampled using a Poisson distribution. In this manner, the viewer's eye are approximated as an ideal lens focused at a depth z which changes depending on the viewer's accommodative state. For each chief ray $(\theta_x, \theta_y)$ and depth z, a bundle of rays are summed across $R_{\theta_x, \theta_y, z}$ from the Poisson-sampled pupil. This produces an estimate of the retinal blur when focused at a depth z. These are defined preceding steps as the forward operator $r=A_{z,\phi}$ (c), which accepts a phase function φ and color image c and predicts the perceived retinal image r when focused at a distance z.

For a fixed phase function φ and accommodation depth z, the forward operator $A_{z,\phi}$ (c) is linear in the color image c. The rendering operators $A_{z,\phi i}$ ($c_i$) combine additively, so our combined forward operator, representing viewing of multiple-component focal surface displays, is $A_z (c_1, \ldots, c_k)=\Sigma_i A_{z,\phi i} (c_i)$. The forward renders can be concatenate for multiple accommodation depths $z_1, \ldots, z_l$ to estimate the reconstructed focal stack, with corresponding linear operator $A=[Az_1; \ldots ; Az_1]$. The forward operator, for a given set of color images c, gives the focal stack r that would be produced on the retina—minimizing $\|Ac-r\|^2$ gives the color image best approximating the desired focal stack. The transpose of Az, φ, mapping retinal image samples to display pixels, can be similarly evaluated with ray tracing operations with accumulation in the color image c rather than the retinal image r. In conclusion, these forward and adjoint operators are applied with an iterative least squares solver.

The phase functions, when executed by the SLM, causes the SLM to reproduce a focal pattern corresponding to the each focal surface. This is achieved by the SLM adding phase delays to a wavefront of the light from the electronic display. The phase delays cause the shape of the wavefront to be bent and warped into the shape of each focal surface to thereby produce a focal pattern that conforms to the scene geometry. In one embodiment, the SLM time-multiplexes the adjustment of the wavefront for each focal surface in order to provide focus for each of the different focal surfaces in the virtual scene to a viewing user. For example, at a first time, the SLM adjusts the wavefront for a far depth; at a second time, the SLM adjust the wavefront for an intermediate depth; and at a third time, the SLM adjusts the wavefront for near depth. The speed in which the time-multiplexing adjustment of these three depths occurs is generally too fast for the human eye to notice and, therefore, the viewing user observes the virtual scene in focus, or at least as modeled and/or approximated.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A method comprising:
    segmenting a virtual scene into a set of focal surfaces based on scene geometry data for the virtual scene, the scene geometry data identifying depths for one or more objects in the virtual scene;
    adjusting, for a focal surface from the set of focal surfaces, a shape of the focal surface that minimizes a distance between the focal surface and one or more nearest objects in the virtual scene to the focal surface; and
    generating, for the focal surface, a phase function for a spatial light modulator (SLM) to adjust a wavefront of light of the virtual scene, the phase function when applied by the SLM introduces phase delays in the wavefront that reproduces a focal pattern corresponding to the adjusted shape of the focal surface.

2. The method of claim 1, wherein the SLM is configured to:
    receive the wavefront of light of the virtual scene;
    adjust, for the focal surface, the wavefront based on the phase function; and
    provide the adjusted wavefront of the light of the virtual scene for the focal surface to an exit pupil of a head mounted display (HMD).

3. The method of claim 1, wherein segmenting the virtual scene into the set of focal surfaces based on the scene geometry further includes:
    clustering depth values of the one or more objects in the virtual scene to one or more clustered depth values; and
    determining a depth for the focal surface that minimizes the distance between the focal surface and a clustered depth value of the one or more the clustered depth values.

4. The method of claim 3, wherein segmenting the virtual scene into the set of focal surfaces based on the scene geometry further includes:
    applying a non-linear least squares optimization between the focal surface and the one or more clustered depth values.

5. The method of claim 1, wherein segmenting the virtual scene into the set of focal surfaces based on the scene geometry further includes:
    approximating a range of depth values of the one or more objects to a set of discrete depth values, each focal surface from the set of focal surfaces corresponding to a different discrete depth value.

6. The method of claim 5, wherein the set of discrete depth values each correspond to a mean depth value of a set of clustered depth values.

7. The method of claim 1, wherein the SLM is included in a head mounted display (HMD) with an electronic display configured to display the virtual scene, and wherein the electronic display and the SLM time-multiplex adjustment of the wavefront for each focal surface of the set of focal surfaces based on the corresponding phase function to generate a composite image of the virtual scene that is provided to a user viewing the virtual scene via the HMD.

8. The method of claim 1, wherein the phase function shifts light of the virtual scene for the focal surface by introducing phase delays associated with the adjusted shape of the focal surface, and wherein the focal surface is at least one of a continuously-varying shape or a discontinuous surface.

9. A method comprising:
    segmenting, by a head mounted display (HMD), a virtual scene into a first focal plane and a second focal plane based on scene geometry for the virtual scene, the first focal plane associated with a first set of nearest scene points and the second focal plane associated with a second set of nearest scene points;
    adjusting a first shape of the first focal plane to generate a first focal surface that minimizes distances between each scene point of the first set of nearest scene points and the first focal surface;
    adjusting a second shape of the second focal plane to generate a second focal surface that minimizes distances between each scene point of the second set of nearest scene points and the second focal surface; and generating, for each of the first focal surface and the second focal surface, a phase function for the SLM to adjust a wavefront of light of the virtual scene, the phase function when applied by the SLM introduces phase delays in the wavefront that reproduces a focal pattern corresponding to the adjusted shape of the first focal surface or the second focal surface.

10. The method of claim 9, wherein the HMD further includes an electronic display configured to display the virtual scene, and wherein the electronic display and the SLM time-multiplex adjustment of the wavefront for the first focal surface or the second focal surface based on the corresponding phase function to generate a composite image of the virtual scene.

11. The method of claim 9, wherein segmenting the virtual scene into the first focal plane and the second focal plane includes:
    clustering depth values of the one or more objects in the virtual scene to identify the first set of nearest scene points and the second set of nearest scene points;
    determining a first depth for the first focal surface that minimizes distance between the first focal surface and the first set of nearest scene points; and
    determining a second depth for the second focal surface that minimizes distance between the second focal surface and the second set of nearest scene points.

12. The method of claim 11, wherein segmenting the virtual scene into the first focal plane and the second focal plane further includes:
    performing a non-linear least squares optimization between the first focal surface and the first set of nearest scene points and between the second focal surface and the second set of nearest scene points.

13. The method of claim 9, wherein the first focal surface and the second focal surface are at least one of a continuously-varying shape or a discontinuous surface.

14. The method of claim 9, wherein segmenting the virtual scene into the first focal plane and the second focal plane includes:
    approximating a range of the depth values of one or more objects in the virtual scene to a first discrete depth value and a second discrete depth value, first discrete depth value corresponding to the first focal surface and a second discrete depth value corresponding to the second focal surface.

15. A head mounted display (HMD) comprising:
at least one processor;
an electronic display configured to display a virtual scene;
an optics block including a spatially programmable focusing element configured to focus light from the electronic display; and
memory including instructions that, when executed by the at least one processor, cause the at least one processor to:
    segment the virtual scene into a set of focal surfaces based on scene geometry data for the virtual scene, the scene geometry data identifying depths for one or more objects in the virtual scene;
    adjust, for a focal surface from the set of focal surfaces, a shape of the focal surface that minimizes a distance between the focal surface and one or more nearest objects in the virtual scene to the focal surface; and
    generate, for the focal surface, a phase function for the SLM to adjust a wavefront of light of the virtual scene, the phase function when applied by the SLM introduces phase delays in the wavefront that reproduces a focal pattern corresponding to the adjusted shape of the focal surface.

16. The HMD of claim 15, wherein the optics block is further configured to:
    receive the wavefront of light of the virtual scene from the electronic display;
    adjust the wavefront based on the phase function associated with the focal surface; and
    provide the adjusted wavefront for the focal surface to a user via an exit pupil of the HMD.

17. The HMD of claim 15, wherein segmenting the virtual scene into the set of focal surfaces based on the scene geometry further includes:
    clustering depth values of the one or more objects in the virtual scene to one or more clustered depth values; and
    determining a depth for the focal surface that minimizes the distance between the focal surface and a clustered depth value of the one or more the clustered depth values.

18. The HMD of claim 17, wherein segmenting the virtual scene into the set of focal surfaces based on the scene geometry further includes:
    applying a non-linear least squares optimization between the focal surface and the one or more clustered depth values.

19. The HMD of claim 15, wherein segmenting the virtual scene into the set of focal surfaces based on the scene geometry further includes:
    approximating a range of the depth values of the one or more objects to a set of discrete depth values, each focal surface from the set of focal surfaces corresponding to a different discrete depth value.

20. The HMD of claim 15, wherein the phase function shifts light of the virtual scene for the focal surface by introducing phase delays associated with the adjusted shape of the focal surface, and wherein the focal surface is at least one of a continuously-varying shape or a discontinuous surface.

* * * * *